Patented Mar. 1, 1949

2,463,225

UNITED STATES PATENT OFFICE 2,463,225

POLYMERIZATION OF DIENES

John Richard Vincent, Newport, Del., assignor to E. I. du Pont de Nemours & Company, Wilmington, Del., a corporation of Delaware No Drawing. Application September 21, 1945, Serial No. 617,919

12 Claims. (Cl. 260—92.7)

This invention relates to a process for effecting polymerization of 1,3-dienes, and more particularly to the preparation of synthetic elastomers which have good processing properties and other desirable characteristics.

In the polymerization of 1,3-butadienes in the absence of modifying agents, polymers are obtained normally which are tough and dry and which are therefore difficult or impossible to handle in the usual types of rubber processing machinery. Modifying agents are therefore usually employed to give polymers which are soft and which are readily processable or which can be made soft and readily processable by mechanical working or by the addition of small amounts of peptizing agents (chemical softeners). The commonly used modifying agents are sulfur or sulfur-containing substances such as mercaptans, which are employed usually in amounts up to 2% of the weight of the polymers. In addition to its modifying effect, sulfur, when present during the polymerization, particularly of chloroprene, improves the physical properties of films of the polymers deposited directly from their aqueous dispersions. In general, the improved plasticity of the synthetic rubbers of the butadiene types is obtained by the addition of reagents which ordinarily retard polymerization, such as sulfur or sulfur compounds, and therefore it has been necessary to employ with these modifying agents catalysts or accelerators which increase the rate of polymerization.

Sulfur and sulfur-containing compounds often render synthetic elastomers unsuitable for certain uses because of the presence of the sulfur in the finished elastomer, and usually they impart to the elastomer an odor which, in many cases, is undesirable. It is therefore desirable that modifiers for butadiene-type elastomers be produced which do not impart to the synthetic elastomers the objectionable properties imparted thereto by the sulfur or sulfur-containing compounds, and which are free from the metal compounds often required to effect polymerization when sulfur or sulfur compounds are used as modifying agents.

It is therefore an object of this invention to provide a process for producing butadiene-type synthetic elastomers whereby they may be obtained in a plastic and readily processable form. A further object of the invention is to provide a process for producing butadiene-type polymers which do not contain sulfur, and in which a modifying agent is employed which does not retard the polymerization of the monomers. A still further object of the invention is to provide a process for producing chloroprene polymers which have improved storage stability, flatter curing curves (that is, little variation in the physical properties of vulcanizates for a wide range of curing times), better resistance to heat aging and better resistance to cut growth. A still further object is to provide a process for producing chloroprene polymers by emulsion polymerization that gives latices which have improved stability because of the reduced amount of electrolytes present and which give films by evaporation or coagulation that have improved physical properties.

I have found that the polymerization of 1,3-butadiene hydrocarbons (such as 1,3-butadiene, isoprene, 2,3-dimethyl-1,3-butadiene), and haloprenes (for example, 2-chloro-1,3-butadiene, also known as chloroprene), etc., can be effected in the presence of small amounts of a compound of the group consisting of iodoform, tetra-iodomethane and alkyl-iodoform (in which the alkyl group contains from 1 to 6 carbon atoms) to give polymers which are plastic and readily processable and which have improved properties. These compounds, which contain the —$CI_3$ group, are compounds which effectively modify the characteristics of the polymers without retarding the rate of polymerization to the extent normally experienced with sulfur compounds, so that polymers which are readily processable may be obtained efficiently and without the addition of excess amounts of polymerization catalysts. The polymers are obtained in the plastic and readily processed state, either directly upon isolation or by the application of well known procedures such as milling, preferably in the presence of stabilizing agents. Thin-walled articles having the improved physical properties mentioned above are also obtained by the usual methods, such as by evaporation or coagulation of the latex in thin films, followed by curing.

The following examples are given to illustrate the invention. The parts used are by weight.

Example 1

Chloroprene was polymerized in an emulsion for two hours at 40° C., using the following recipe, the iodoform and rosin being first dissolved in the chloroprene, which was then emulsified in the water containing the other ingredients.

| | Parts |
|---|---|
| Chloroprene | 100 |
| Water | 150 |
| Daxad-11[1] | 0.75 |
| Nancy wood rosin | 4.0 |
| Sodium hydroxide | 0.9 |
| Potassium persulfate | 0.6 |
| Iodoform | as indicated |

[1] Sodium salt of the condensation product of naphthalene sulfonic acid and formaldehyde.

In each case the polymerization was stopped after the two hour period by the addition of 2 parts of tetraethyl thiuram disulfide, the latex was coagulated and the polymers were washed with water on a corrugated mill and dried on a smooth mill. The resulting data are tabulated below:

| Parts of Iodoform | Per cent Yield | Plasticity[1] | Recovery[1] | Description of Polymer |
|---|---|---|---|---|
| 0 | 101 | 293 | 103 | Tough and dry. |
| 1.0 | 99 | 39 | 0 | Very soft and tacky. |
| 2.0 | 85 | | | Extremely soft and tacky. |

[1] The plasticity and recovery measurements, specified in this and the following examples, have been made in the manner specified by Williams—Ind. Eng. Chem. 16, 362 (1924). The lower numbers represent the greater plasticities.

The increase in the degree of modification with increasing concentration of iodoform is very marked.

Example 2

A series of polymers were prepared as in Example 1, except that the polymerization time was 1.5 hours and the polymerization was stabilized by the compounds, as shown in the table.

| Modifying Agent in Parts | Stabilizer | Per cent Yield | Millability |
|---|---|---|---|
| Sulfur, 0.5 | Tetraethyl thiuram disulfide 2%. | 98 | Good. |
| Iodoform, 0.25 | Stabilizer [1] 3% | 98 | Excellent. |
| Iodoform, 0.50 | do.[1] | 92 | Soft and tacky. |

[1] N-phenyl-alpha-naphthylamine 55%+diphenylamine 45%.

These two examples show that iodoform is a very effective modifying agent for chloroprene polymerization in an alkaline emulsion. Example 3 shows that it is also an excellent modifying agent in an acid polymerization system.

Example 3

Chloroprene was polymerized for one hour at 40° C. in an emulsion prepared as indicated by the following recipe:

| | Parts |
|---|---|
| Chloroprene | 100 |
| Water | 150 |
| Sulfated oleyl acetate | 7.74 |
| Acetic acid | 0.5 |
| Daxad-11 (see Ex. 1) | 1.0 |
| Modifying agent | as indicated |
| Potassium persulfate | as indicated |

| Parts of Potassium Persulfate | Parts of Modifying Agent | Parts of Stabilizer | Per cent Yield | Plast. | Rec. |
|---|---|---|---|---|---|
| 1.0 | 0.5 part sulfur | 2 tetraethyl thiuram disulfide. | 104 | 160 | 64 |
| 1.0 | 1.0 part iodoform | None | 85 | 16 | 0 |
| 0.0 | None | do | 103 | 335 | |

Example 4

Iodoform was compared to DD mercaptan (which is a mixture of aliphatic mercaptan having an average chain length of about 12 carbon atoms) as a modifying agent for the polymerization of chloroprene at 100° C. in an emulsion composed of:

| | Parts |
|---|---|
| Chloroprene | 100 |
| Water | 150 |
| Oleic acid | 4 |
| Potassium persulfate | 1 |
| Daxad-11 (see Ex. 1) | 1 |
| Sodium hydroxide | 1.575 |
| Nancy wood rosin | 2.0 |
| Modifying agent | as indicated |

The polymers were stabilized with 3% of N-phenyl-alpha-naphthylamine 55%+diphenylamine 45%.

| Parts of Modifying Agent | Seconds at 90°–100° C. | Per cent Yield | Millability of Polymer |
|---|---|---|---|
| 0.25 Iodoform | 60 | 78 | Broke down to give a good milling polymer |
| Do | 120 | 98 | Do. |
| 0.5 DD Mercaptan | 120 | 98 | Very rough—poor milling at mill temp. 30° C. |
| 0.5 Iodoform | 120 | 96 | Very smooth — good milling ability. |

Example 5

Sulfur and iodoform were compared as modifying agents by polymerizing chloroprene at 10° C. in an emulsion consisting of:

| | Parts |
|---|---|
| Chloroprene | 100 |
| Nancy wood rosin | 4 |
| Daxad-11 (see Ex. 1) | 0.75 |
| Sodium hydroxide | 0.81 |
| Potassium persulfate | 0.65 |
| Potassium ferricyanide | 0.55 |
| Water | to dilute to 38% chloroprene emulsion |
| Modifying agent | as indicated |

The polymerization was carried to a yield of 96% to 97% with iodoform and 95% to 96% with sulfur. The emulsions were coagulated by freezing in thin layers and the polymers were dried with hot air and milled.

| Parts of Modifying Agent | Parts of Stabilizer | Plasticity | Recovery |
|---|---|---|---|
| 0.6 Sulfur | 2.5 tetraethyl thiuram disulfide | 86 | 0 |
| Do | None | 172 | 125 |
| 0.25 Iodoform | do | 101 | 6 |

It is shown that 0.25 part of iodoform is more effective than 0.6 part of sulfur.

Example 6

The effect of the modifying agent on the rate of polymerization is illustrated by the following data for chloroprene polymerization at 40° C. in an alkaline emulsion (see recipe in Ex. 4). Each polymerization was continued until substantially the same specific gravity was reached, indicating the formation of the same amount of polymer, and the time required for this was recorded.

| Parts of Modifying Agent | Final Specific Gravity (of emulsion) | Time of Polymerization |
|---|---|---|
|  |  | Minutes |
| 0.35 Iodoform | 1.0685 | 37 |
| 0.35 Iodoform+0.1 part sulfur | 1.068 | 47 |
| 0.6 Sulfur | 1.0685 | 80 |

Thus, the polymerization is much more rapid when iodoform is used as the modifying agent.

Example 7

Carbon tetraiodide (0.25 part), used in place of the iodoform of Example 1, gave a yield 90% of a plastic polymer, similar to that obtained as Example 2, using 0.25 part of iodoform. Using 0.5 part of carbon tetraiodide, a still more plastic product, similar to that made with 0.5 part of iodoform, was obtained.

Very similar polymers were formed, using 0.25 and 0.5 part, respectively, of methyliodoform, $CH_3CI_3$, in place of the iodoform of Example 2.

The value of iodoform as a modifying agent is not limited to the polymerization of chloroprene. The following examples illustrate its use with other polymerizables.

Example 8

|  | Parts |
|---|---|
| Chloroprene | 75.0 |
| Butadiene | 25.0 |
| Sulfated oleyl acetate | 10.0 |
| Potassium persulfate | 0.5 |
| Daxad-11 (see Ex. 1) | 0.5 |
| Acetic acid | 0.5 |
| Water | to produce a 40% emulsion |
| Modifying agent | 0.4 |

Using this recipe and polymerizing at 40° C. for 4 hours, the use of DD mercaptan (see Ex. 4) or iodoform resulted in a 90% yield of polymer. With DD mercaptan a very tough, poor milling product was obtained, while with iodoform the polymer had initially fairly good milling characteristics which improved on continued milling.

Similar results may be obtained, using chloroprene and isoprene instead of chloroprene and butadiene.

Example 9

Polymers of 75% butadiene-1,3 and 25% acrylonitrile were prepared in the following emulsion (amounts based on 100 parts of monomer mixture), using both iodoform and DD mercaptan as the modifying agents.

|  | Parts |
|---|---|
| Water | 150 |
| Oleic acid | 4.0 |
| Potassium persulfate | 1.0 |
| Daxad-11 (see Ex. 1) | 1.0 |
| Sodium hydroxide | 1.075 |
| Potassium ferricyanide | 0.15 |
| Modifying agent | 1.0 |

The polymerizations were carried out at 40° C. and were stabilized with 3% of a stabilizer consisting of N-phenyl-alpha-naphthylamine 55%+ diphenylamine 45% (see Ex. 2). The latices were coagulated with brine and acetic acid. The polymers were washed and dried on a mill, and compared as follows:

| Modifying Agent | Yield | Plast. | Rec. | Cured for 30 minutes at 307° F. | | |
|---|---|---|---|---|---|---|
|  |  |  |  | Modulus | Tensile Strength | Elong. |
| DD Mercaptan | 102 | 290 | 140 |  | 3,380 | 280 |
| Iodoform | 102 | 170 | 137 | 1,310 | 3,490 | 550 |

Three per cent (3%) of iodoform modifies a 55 butadiene-45 styrene mixture to a polymer, which undergoes plastic flow at room temperature.

Example 10

A mixture of butadiene (75%) and styrene (25%) was polymerized in the system used in Example 9 for 41 hours at 40° C. The products were coagulated and dried in the same manner.

| Per Cent Iodoform | Per Cent Yield | Plast. | Recovery |
|---|---|---|---|
| 0 | 74 | 332 | 148 |
| 0.25 | 81 | 175 | 121 |
| 0.5 | 76 | 111 | 119 |

Similarly, a very plastic product was obtained by polymerizing a mixture of 75% butadiene and 25% methyl methacrylate in the presence of 0.4% of iodoform.

Example 11

A 50% polychloroprene latex with iodoform as the principal modifying agent was made by the recipe shown in the first column of the following table, and was compared with a latex modified with sulfur which gave a polymer with substantially the same physical properties, made by the recipe given in the second column.

| | | |
|---|---|---|
| Chloroprene parts | 100 | 100 |
| Iodoform do | 0.1 | |
| Sulfur do | | 0.25 |
| Nancy wood rosin do | 4 | 4 |
| Sodium hydroxide do | 1.05 | 1.05 |
| Potassium persulfate do | 0.4 | 0.25 |
| Potassium ferricyanide | | 0.25 |
| Water | | |
| Polymerization time at 40% parts | 100 | 100 |
| Yield of polymer hours | 5 | 6.5 |
| percent | 100 | 96 |

In addition to the more rapid and complete polymerization of the iodoform latex of this example, it is also free from the odor and fire hazard arising from the unpolymerized chloroprene and is also free from the nitrile-like odor and tendency to turn green or blue due to the ferricyanide present in the ferricyanide latex. It will also be noted that the first latex of this example, in spite of its higher yield and faster polymerization, requires less total catalyst and contains less electrolyte. As mentioned, above, however, the physical properties of the polymer made with iodoform, when examined in the form of thin films obtained by evaporation or coagulation followed by curing are fully as good as those of the sulfur-modified polymer, and the latex is satisfactory for all the uses to which latices of this type are applied, such as the manufacture of thin-walled articles and sponge.

While the above examples, which illustrate this invention applied to butadiene elastomers, have been limited to the co-polymerization of butadiene with other materials, the iodoform and related compounds operate to modify the polymerization of butadiene hydrocarbons alone in a manner similar to that illustrated in the above examples, but, since the butadiene, isoprene, etc., homopolymers have not come into extensive use, the invention is especially useful in modifying the polymerization of the butadiene elastomers which are copolymers with styrene, acrylates, etc., as well as in the polymerization of chloroprene, bromoprene and the like. The invention is particularly suitable in effecting polymerization of monomeric material in which the 1,3-diene compound, namely, the butadiene or halogen butadiene, is used in the preponderant amount.

While the iodoform modified chloroprene polymers, upon vulcanization, sometimes cure somewhat more slowly than the corresponding sulfur modified polymers, the physical properties of the vulcanizates of the iodoform products are at least as good as those of the sulfur products, even though the polymers differ markedly in processing characteristics. The modulus of elasticity, tensile strength and elongation at break of iodoform modified polychloroprene are substantially the same as those of the sulfur modified polychloroprene which has been compounded in the same manner and which has been prepared by polymerization processes which are otherwise the same. The vulcanization and vulcanizates of iodoform-modified butadiene polymers are also most satisfactory, as illustrated in Example 9.

The examples cited show that iodoform is an unusually effective modifying agent for the polymerization of dienes and for the interpolymerization of dienes with each other and with mono-olefinic compounds. It is effective in both acid and alkaline emulsions, and over a wide temperature range. This modifying agent is effective at any concentration between 0.05% and 10.0%, the preferred range of concentrations being between 0.1% and 2%. It is effective when used in combination with other modifying agents, such as sulfur, mercaptans, thiuram disulfides, xanthogen disulfides, substituted phosphines, diazo compounds, etc.

Although the above examples illustrate the use of iodoform and related products in the polymerization of butadiene, chloroprene and co-polymers of the same with co-polymerizable materials, which are carried out by emulsion polymerization processes, it has been found that the use of these tri-iodomethyl compounds is also applicable in the massive polymerization of this type of polymerizable material, wherein they give a similar modifying effect. When the polymerization is carried out in emulsion, any of the emulsifying agents ordinarily used in the polymerization of butadiene and chloroprene may be used, such as those disclosed in U. S. P. 2,264,173.

The polymerization is preferably carried out in the presence of a polymerization accelerator, although, as pointed out above, because the iodoform and related compounds have little retarding effect upon polymerization compared with that of other modifying agents, when used in equivalent amounts, smaller amounts of accelerators are required in general than in the case of other modifying agents. Peroxy compounds such as persulfates and peroxides are preferred accelerators.

It will be noted that the modifying agents which have been found particularly suitable for use in place of the sulfur and sulfur-containing compounds are compounds which carry the $-CI_3$ grouping and which are exemplified by compounds having the formula $R-CI_3$ in which R stands for $-H$, $-I$, and an alkyl group containing not more than 6 carbon atoms.

The use of modifying agents of this type makes possible the production of sulfur-free elastomers. It also permits the preparation of chloroprene polymers having improved storage stability, flatter curing curves and better resistance to heat aging and to cut growth than can normally be obtained. Their use allows more rapid polymerization of chloroprene than can be obtained by the use of an equivalent amount of sulfur, thus resulting in increased production or in the use of decreased amounts of polymerization catalysts. Where the invention is employed in the preparation of synthetic elastomer latex, it is found that the latices produced are more stable because of a lower concentration of electrolytes present therein. Where the iodoform or related compound is used to completely replace the sulfur or sulfur derivatives, synthetic rubbers are obtained which are free from the odors often associated with the sulfur modified products.

The extremely plastic polymers, such as those made in Examples 1, 3, etc., have an important use as cements of low viscosity and high solids content. It is possible with iodoform as a modifying agent, either with or without sulfur, to obtain polymers of much greater plasticity for this purpose than is possible by the use of sulfur alone.

I claim:

1. In the preparation of synthetic rubber-like polymers from 1,3-butadienes, the step which comprises carrying out the polymerization of the 1,3-butadiene in the presence of from 0.05% to 10.0%, based on the weight of the butadiene, of a polymerization modifier of the formula $R-CI_3$, in which R stands for a substituent of the group consisting of $-H$, $-I$ and $-CH_3$.

2. In the preparation of synthetic rubber-like polymers from 1,3-butadienes, the step which comprises carrying out the polymerization of the 1,3-butadiene in an aqueous emulsion in the presence of from 0.05% to 10.0%, based on the weight of the butadiene, of a polymerization modifier of the formula $R-CI_3$, in which R stands for a subtituent of the group consisting of $-H$, $-I$ and $-CH_3$.

3. In the preparation of synthetic rubber-like polymers from 1,3-butadienes, the step which comprises carrying out the polymerization of the 1,3-butadiene in an alkaline aqueous emulsion in the presence of from 0.05% to 10.0%, based on the weight of the butadiene, of a polymerization modifier of the formula $R-CI_3$, in which R stands for a substituent of the group consisting of —H, —I and —CH₃.

4. In the preparation of synthetic rubber-like polymers from 1,3-butadienes, the step which comprises carrying out the polymerization of the 1,3-butadiene in the presence of from 0.05% to 10.0%, based on the weight of the butadiene, of a polymerization accelerator and a polymerization modifier of the formula R—CI₃, in which R stands for a substituent of the group consisting of —H, —I and —CH₃.

5. In the preparation of synthetic rubber-like polymers from 1,3-butadienes, the step which comprises carrying out the polymerization of the 1,3-butadiene in an alkaline aqueous emulsion in the presence of from 0.05% to 10.0%, based on the weight of the butadiene, of a polymerization accelerator and a polymerization modifier of the formula R—CI₃, in which R stands for a substituent of the group consisting of —H, —I and —CH₃.

6. In the preparation of a synthetic rubber-like chloroprene polymer, the step which comprises carrying out the polymerization of the chloroprene in the presence of from 0.50% to 10.0%, based on the weight of the chloroprene, of a polymerization modifier of the formula R—CI₃, in which R stands for one of the substituents of the group consisting of —H, —I and —CH₃.

7. In the preparation of a synthetic rubber-like chloroprene polymer, the step which comprises carrying out the polymerization of the chloroprene in an aqueous emulsion and in the presence of from 0.05% to 10.0%, based on the weight of the chloroprene, of a polymerization modifier of the formula R—CI₃, in which R stands for one of the substituents of the group consisting of —H, —I and —CH₃.

8. In the preparation of a synthetic rubber-like chloroprene polymer, the step which comprises carrying out the polymerization of the chloroprene in an alkaline aqueous emulsion and in the presence of from 0.05% to 10.0%, based on the weight of the chloroprene, of a polymerization modifier of the formula R—CI₃, in which R stands for one of the substituents of the group consisting of —H, —I and —CH₃.

9. In the preparation of a synthetic rubber-like chloroprene polymer, the step which comprises carrying out the polymerization of the chloroprene in the presence of from 0.05% to 10.0%, based on the weight of the chloroprene, of iodoform.

10. In the preparation of a synthetic rubber-like chloroprene polymer, the step which comprises carrying out the polymerization of the chloroprene in an aqueous emulsion and in the presence of from 0.05% to 10.0%, based on the weight of the chloroprene, of iodoform.

11. In the preparation of a synthetic rubber-like chloroprene polymer, the step which comprises carrying out the polymerization of the chloroprene in an alkaline aqueous emulsion and in the presence of from 0.05% to 10.0%, based on the weight of the chloroprene, of iodoform.

12. In the preparation of a synthetic rubber-like chloroprene polymer, the step which comprises carrying out the polymerization of the chloroprene in an aqueous emulsion in the presence of from 0.05% to 10.0%, based on the weight of the chloroprene, of iodoform and a polymerization accelerator.

JOHN RICHARD VINCENT.

REFERENCES CITED

The following references are of record in the file of this patent:

UNITED STATES PATENTS

| Number | Name | Date |
|---|---|---|
| 1,898,522 | Bock et al. | Feb. 21, 1933 |
| 2,279,293 | Clifford | Apr. 14, 1942 |

OTHER REFERENCES

Mellor: Modern Inorganic Chemistry, 1930, Longmans, Green and Co., N. Y., page 352.

Certificate of Correction

Patent No. 2,463,225. March 1, 1949.

JOHN RICHARD VINCENT

It is hereby certified that error appears in the printed specification of the above numbered patent requiring correction as follows:

Column 9, line 25, claim 6, for "0.50%" read *0.05%*;

and that the said Letters Patent should be read with this correction therein that the same may conform to the record of the case in the Patent Office.

Signed and sealed this 16th day of August, A. D. 1949.

[SEAL]

THOMAS F. MURPHY,
*Assistant Commissioner of Patents.*